United States Patent [19]

Nolte

[11] Patent Number: 4,753,216

[45] Date of Patent: Jun. 28, 1988

[54] GRILLING APPARATUS

[76] Inventor: Ben J. Nolte, 511 Forest Green Dr., Coraopolis, Pa. 15108

[21] Appl. No.: 93,776

[22] Filed: Sep. 8, 1987

[51] Int. Cl.$^4$ ............................................. F24C 3/04
[52] U.S. Cl. .................... 126/41 C; 99/389; 99/443 C; 432/141; 432/147
[58] Field of Search .......... 126/41 C, 41 B; 99/389, 99/390, 391, 443 C; 432/141, 147

[56] References Cited

U.S. PATENT DOCUMENTS 2,754,104 7/1956 Hess ................................. 432/147
2,839,409 6/1958 Matlen ............................. 99/391

Primary Examiner—Carroll B. Dority, Jr.
Attorney, Agent, or Firm—William J. Ruano

[57] ABSTRACT

A grilling apparatus comprising a plurality of confronting pairs of heat emitters, a continuous conveyor therebetween having a plurality of spaced suspended hooks for conveying meat. At predetermined spacings, ramps are provided for tilting and releasing the hooks and suspended meat only as to those having sufficient lengths of lateral arms as to be engageable with the ramps. Shorter length lateral arms will clear the ramps to enable longer cooking of the suspended meat.

2 Claims, 2 Drawing Sheets

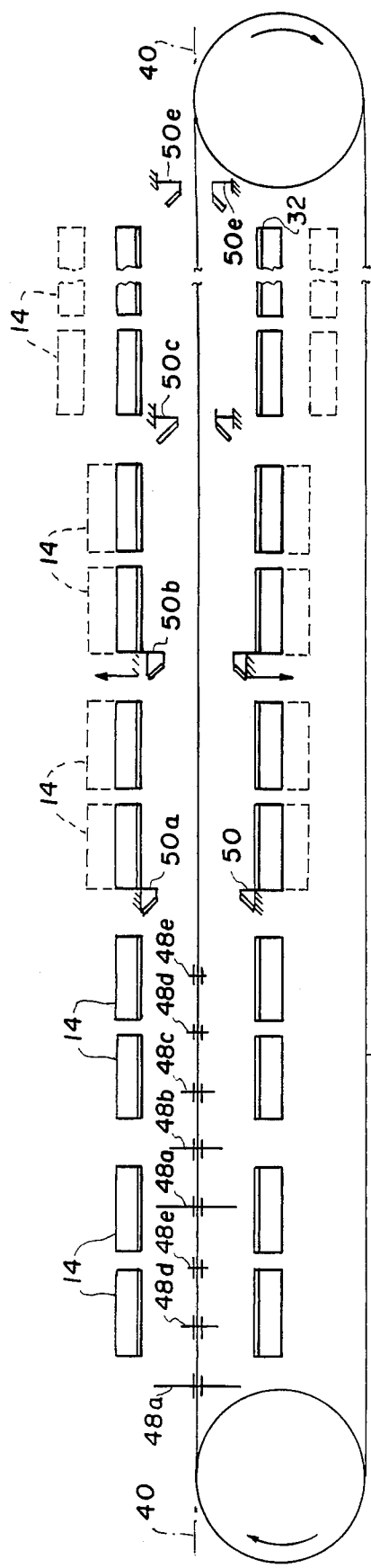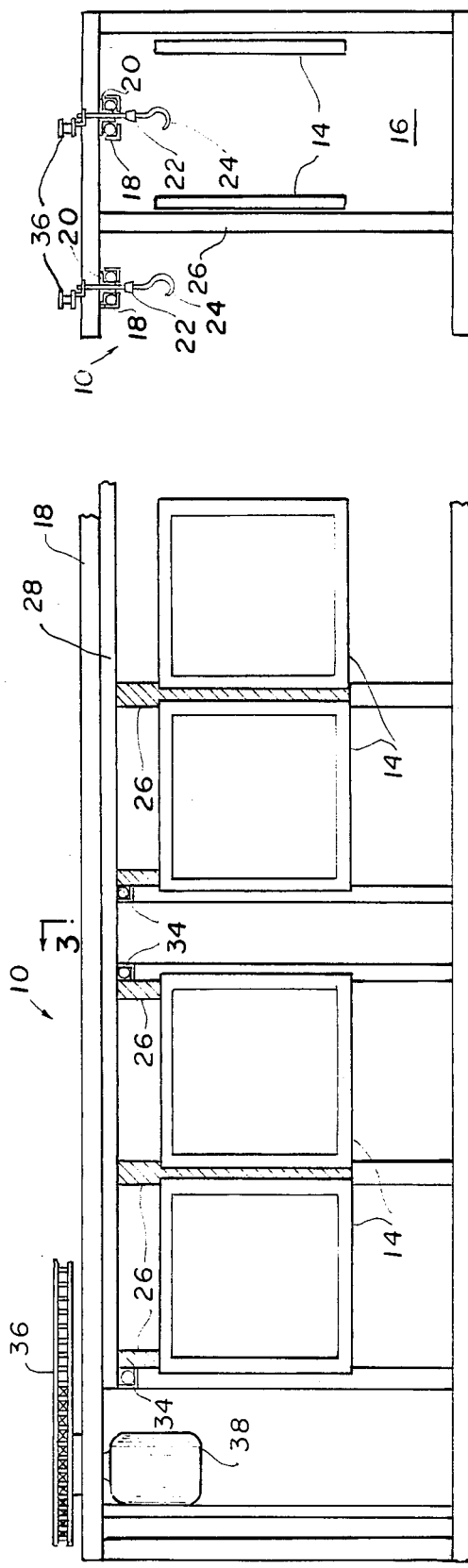

GRILLING APPARATUS

This invention relates to a cooking apparatus and to a method of cooking food. The apparatus and method are applicable, in particular, to the grilling of meat.

BACKGROUND OF THE INVENTION

Grilling apparatus presently known have the outstanding disadvantage of not being reliable to grill meats at the desired condition, such as rare, medium rare, well done, etc. Furthermore, there is no equipment available that will perform such a function with large quantites of meat and automatically.

SUMMARY OF THE INVENTION

According to the invention, there is provided an apparatus for cooking food, including:

at least one pair of opposed emitters of infra-red radiation, that are, in use, horizontally opposed to define between them a cooking space. The emitters are arranged so as to direct radiation inwardly towards the cooking space; and a planar holder for holding food to be cooked. The holder is removably located in an extending plane within the cooking space to enable the food to be exposed simultaneously to radiation from different directions.

The emitters may be grouped together in two sets, or multiples thereof, the sets being spaced apart to define between them the cooking space, and the emitters of each set being substantially co-planer and being arranged to emit radiation towards the cooking space. The emitters of each pair may face each other across the cooking space.

When the cooking apparatus is intended for the continuous cooking of food, units of pairs may be arranged in linear fashion with the respective emitters of each pair being equidistant from and facing a central major axis of the cooking apparatus. Instead, the distances between the emitters of at least some of the pairs may differ from the distances between the emitters of the other pairs.

The infra-red emitters may comprise electrically operated sources of infra red radiation, but are preferably provided by gas burners.

The holder for holding the food to be cooked, may comprise steel hooks or various types of suspended holders, such as grids or mesh-covered frames, on which, or between which, pieces of food are held in planar configuration. Typically, the holders are connectable in face-to-face relationship to hold between them the pieces of food, whereas the hooks could be of a single or double type.

The hooks or holders may be supported in a substantially vertical plane within the cooking space and preferably equidistant from the respective burners of each set or pair.

The emitters may be adjustable to vary the intensity of the infra red radiation emitted from them. Instead,or in addition, the relative distance between opposite emitters of a pair or between opposite sets of emitters may be adjustable, so that, in use, the burners may be moved closer or further away from the holder when it is located centrally within the cooking space, thereby also reducing the intensity of radiation to which food within is subjected.

The single emitters or sets of emitters may thus be displaceable along suitable guides or tracks in a direction transverse to the central axis and/or the central upwardly extending symmetrical plane of the cooking space. The holder/hook may be located within the central symmetrical plane when said holder is positioned within the cooking space in use.

The apparatus may further include support means for suspending or supporting the holder/hooks within the cooking space.

Single Units

According to one form of the invention, in a cooking apparatus intended for batch-wise cooking of food, the support means may comprise extended guide tracks from the adjacent into the cooking space, holding moveable carrier hangers from which the hook/holders can be suspended. The holders may be "loaded" and moved along the track into the cooking space while the food is cooked by exposure to radiation simultaneously from opposite directions. Desired retention within the cooking space is pre-determined and measured with a suitable timer. Removal is then manually effected.

Multiple Continuous Units

According to a modification and preferred embodiment of the invention, when the cooking apparatus is intended for the continuous cooking of food, the support means may comprise a conveyor arranged above the cooking space and continuously displaceable relative thereto, the conveyer being provided with connecting formations for co-operation in use with complementary formations on the hanger/hook, whereby the hanger/hook can be suspended from the conveyor in use. The conveyor may comprise an endless chain which is provided with driving means for continuously displacing the chain relative to the cooking space of the cooking apparatus. The hanger/hook, or preferably several hangers/hooks, may be releasably connectable to the conveyor, to permit release of the hangers/hooks from the chain before and after cooking of the food for the "loading" and "unloading" of the food from the holders.

The cooking apparatus, according to the modification of the invention, may also include dislodging means for releasing the hangers/hooks from the chain in use when the food has been cooked to the desired degree. The releasing means may be in the form of one or more ramps located adjacent a vertical plane in which the chain is displaceable. The ramps may be adapted to co-operate with a projection provided on the hanger/hook, to disengage or release the connecting formation of the hanger/hook from the complementary formation of the conveyor.

Thus, in the preferred embodiment of the invention, when the cooking apparatus is intended for continuous use, the emitters may be arranged symmetrically in pairs, about the major axis, to define between the emitters a cooking space in the form of a longitudinally extending passage. In this configuration, the conveyor passes above the cooking space, and the hanger/hooks are connectable to the conveyor to be suspended downwardly therefrom centrally into the cooking space between the rows of emitters. The releasing means can then be arranged to disengage the hangers/hooks from the conveyor wherever desired, so that the handgers/hooks are removed from the cooking space when food within the hangers/hooks has been exposed to the desired amount of radiation; i.e., is appropriately cooked.

The cooking apparatus may further include one or more shields locatable above the cooking space to deflect radiation or heat escaping from the cooking space back into the cooking space. Instead, or in addition, an appropriate heat sink may be provided above the cooking space to collect such heat as escapes therefrom, for utilization elsewhere.

The invention, briefly stated, extends to a method of cooking food, including: locating a planar hanger/hook containing food to be cooked in an upwardly extending plane between at least two emitters of infra-red radiation, and removing the hanger/hook from between the emitters when the food has been submitted to a desired amount of radiation.

The method may include subsequently locating the hangers/hooks between further pairs of emitters of infra-red radiation. Thus, the method may include continuously moving the holder in a cooking space defined between several pairs of emitters, to enable food within the hanger/hook to be subjected to radiation simultaneously from opposite directions.

DETAILED DESCRIPTION OF THE DRAWINGS

FIG. 1 is a top view of a grilling conveyor unit embodying my invention;

FIG. 2 is a partial side view and FIG. 3 is a cross-sectional view thereof taken along line 3—3 of FIG. 2;

Figure 4:
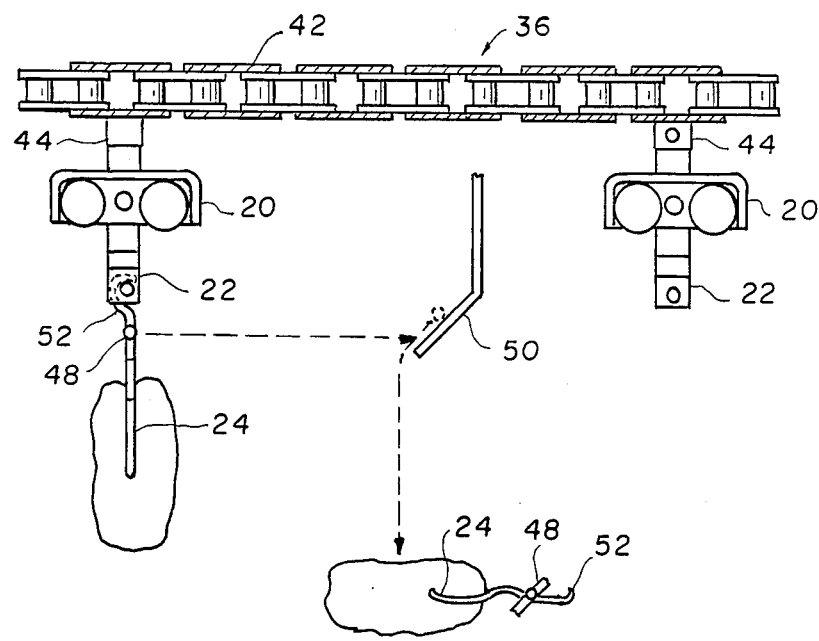
FIG. 4 is an enlarged, fragmentary view of the meat suspending unit shown in FIG. 3 and showing the meat suspending unit after it is detached by ramps 50.

Referring more particularly to FIGS. 1, 2 and 3 of the drawings:

The continuous conveyor apparatus comprises a plurality of unit frames 12 such as six, connected in series to form the main frame which holds, for example, twelve pairs of burners. The burners 14 of each pair are arranged opposite each other in a manner similar to burners 14 shown in FIGS. 1 and 3 for the cooking apparatus 10. The pairs of burners 14 are approximately symmetrical about a central major axis 40 of the apparatus and define a longitudinally extending cooking space between the row of burners 14.

The emitters 14 (FIGS. 2 and 3) are in the form of gas burners, and are mounted on frame 12 by means of vertically mounting brackets 26 and horizontal cross bar 28 moving on ball bearings along support member rails 34 which are attached to frame 12. The distance between the opposing crossbars 28 and opposing emitters 14 can be effected manually or mechanically.

Each of the burners 14 is supplied with combustible gas via a gas supply pipe 30. In use, gas is fed via the supply pipe into the concave shell of each burner 14 where combustion takes place and infrared radiation is emitted through a distribution grid 32 mounted over the open end of the shell of burner 14.

The apparatus further has a chain conveyer 36 extending above the cooking space 16 and lying approximately within a vertical plane passing through the axis 40. The chain 36 is chain-driven from a motor drive 38, which could be directly or indirectly attached.

The attachment chain 36 (shown in FIGS. 4 and 5) comprises a plurality of interconnected standard links 42, with attachment links 44 replacing the standard links 42 at spaced intervals. The attachment links 44 are provided with downwardly depending flanges and each of the attachment links 44 is pivotally suspended from a bolt connection above a roller carrier unit 20. The roller unit 20 comprises two similar angle brackets interconnected back to back enabling it to roll on four ball bearings, holding the hanger brackets 22 between them. Each roller unit 20 then rolls on an endless guide rail 18 which is mounted securely above the cooking space 16, so that the units 20 carry the attachment links 44 and the chain 36, supported above the units 20 and the hanger bracket extended downward between the rails 18.

Figure 5:
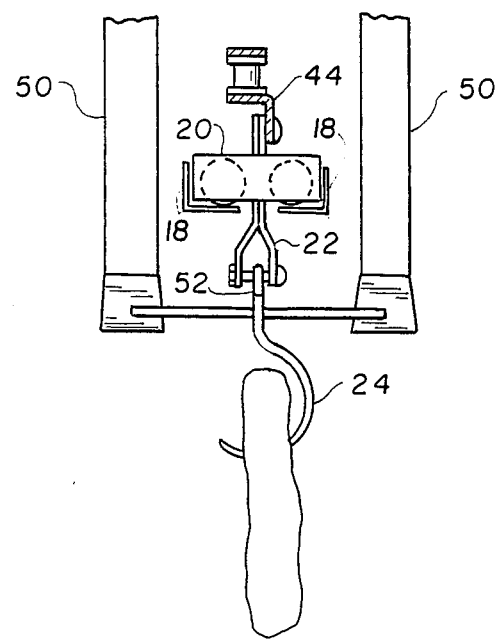
FIG. 5 is an enlarged, fragmentary view taken from the left of FIG. 4.

A hook assembly 24, similar to the hook assembly 24 of FIG. 4 and 5, is of a size to permit one or two pieces of meat to be held thereon. The hook 24 has a co-planar arm extending therefrom, the extension having a small bent hook 52 at its free end. The hook 52 fits slidably into a slot provided in the flanges of the hanger brackets 22, so that the hook assembly 24 is suspended from the hanger bracket 22.

The hook assembly is further provided with transversely extending projections 48 of variable lengths for co-operation with ramps 50 located after each of the last five or so units 10 of the continuous apparatus.

Thus, in operation, pieces of meat are placed on the holder hooks 24 which are then suspended from the chain 36 by locating its hook 52 through the slot in the hanger bracket 22. The moving chain 36 conveys the roller unit 20 into the cooking space 16 between the burners 14 where the food is exposed to radiation from opposite directions as in the first embodiments. When the holder hooks 24 have passed through, for example, the first two units 10, its projections 48, if it is of sufficient length, come into contact with the ramp 50 whereby the hook 52 is pushed out of the slot in which it was located, so that the holder hook 24 is released from the chain 36 and drops downwards out of the cooking space 16 through a transfer chute into a collecting dish.

It will be appreciated that holder hooks 24 with projections 48 of various lengths (FIG. 1) can be used and the ramps 50 after each section can then be spaced progressively closer to the chain 36. Thus, for example, when well-done meat is required, a holder hook 24 with a relatively short projection 48 is selected, so that the projection 48 does not co-operate with the ramps ppsitioned after the first five sections, but is released by the ramp 50 positioned after the last section. Likewise, when underdone meat is required, a holder hook 24 with a relatively longer projection 48 is selected so that the holder hook 24 will be removed after the second section. Dripping grease is collected in covered drip trays placed in each section of the cooking space 16.

The spacing between the burners 14 may be adjusted to vary the intensity of radiation reaching food located within the cooking space 16. Thus, the burners 14 of the last four sections may be spaced progressively further from each other.

An advantage of the present invention is that food within the holder hook assembly 24 exposes simltaneously to radiation from opposite sides, so that the food is cooked relatively quickly and consistently to the required degree, without the interference of burning grease. Highly efficient utilization of energy is experienced. The equipment is thus health, cost, time and energy effective, especially for large quantities of food.

While I have illustrated and described a single specific embodiment of my invention, it will be understood that this is by way of illustration only and that various changes and modifications may be contemplated in my invention within the scope of the following claims.

I claim:

1. Grilling apparatus comprising a plurality of confronting pairs of heat emitters, a continuous means having a plurality of suspended hooks for conveying meat, suspended by said hooks, between said pairs of heat emitters, and means associated with each of said hooks for predetermining the duration of travel of said hooks between said pairs of heat emitters; therefore, the amount of heat to which said meat is exposed, said last named means including means for unhooking said meat in response to a predetermined duration of travel between said pairs of heat emitters.

2. Grilling apparatus as recited in claim 1 wherein said means for unhooking said meat comprises a lateral arm extending from each of said hooks and of various lengths, and cooperating ramps for tilting and releasing said hooks and suspended meat only as to lengths making said lateral arms engageable with said ramps, those of shorter length clearing said ramps to enable longer cooking of the suspended meat, thereby selectively heating meat suspended by said hooks.

* * * * *